(12) United States Patent
Adams et al.

(10) Patent No.: US 8,578,380 B1
(45) Date of Patent: Nov. 5, 2013

(54) PROGRAM CONCURRENCY CONTROL USING CONDITION VARIABLES

(75) Inventors: Keith M. Adams, Sunnyvale, CA (US); Ole Agesen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1103 days.

(21) Appl. No.: 10/929,045

(22) Filed: Aug. 27, 2004

Related U.S. Application Data (60) Provisional application No. 60/531,017, filed on Dec. 17, 2003.

(51) Int. Cl.
  *G06F 9/46* (2006.01)
(52) U.S. Cl.
  USPC .......................................................... 718/100
(58) Field of Classification Search
  USPC .......................................... 178/100; 718/100
  See application file for complete search history.

(56) References Cited

U.S. PATENT DOCUMENTS

| | | | | |
|---|---|---|---|---|
| 5,671,446 A | * | 9/1997 | Rakity et al. | 710/54 |
| 5,797,004 A | * | 8/1998 | Lindholm et al. | 718/104 |
| 5,828,880 A | * | 10/1998 | Hanko | 718/106 |
| 6,026,427 A | | 2/2000 | Nishihara et al. | |
| 6,199,055 B1 | * | 3/2001 | Kara et al. | 705/405 |
| 6,427,161 B1 | * | 7/2002 | LiVecchi | 718/102 |
| 6,976,260 B1 | * | 12/2005 | Ault et al. | 719/314 |
| 2002/0083063 A1 | * | 6/2002 | Egolf | 707/100 |

\* cited by examiner

*Primary Examiner* — Mengyao Zhe

(57) ABSTRACT

A condition variable for controlling access to a critical section of computer code by a plurality of concurrently running execution threads comprises a data structure with a head list linking threads in an arrival order and a tail list linking threads in a reverse arrival order. Together, the head and tail lists together indicate which threads are currently blocked on the condition variable. A wait counter indicates how many threads are currently linked in the data structure and a signal counter indicates how many times the condition variable has been signaled for waiting threads that are currently linked in the data structure. The head and tail pointers, as well as the wait and signal counters, may be implemented as fields of a single, atomically updatable data word.

6 Claims, 3 Drawing Sheets

PROGRAM CONCURRENCY CONTROL USING CONDITION VARIABLES

CROSS-REFERENCE TO RELATED APPLICATIONS

This application claims priority of U.S. Provisional Patent Application No. 60/531,017, filed 17 Dec. 2003.

BACKGROUND OF THE INVENTION

1. Field of the Invention

This invention relates to the control of concurrently running tasks in a computer.

2. Background Art

Researchers and engineers in the field of computer science have developed, and continue to refine, principles and technologies for the construction of efficient and economical general-purpose computer systems. Several significant technologies are characterized below as background for this invention.

Multiprocessor Computer Systems

Most personal computer systems are equipped with a single central processing unit (CPU). Because CPUs today are quite fast, a single CPU often provides enough computational power to handle several "concurrent" tasks by rapidly switching from task to task (a process sometimes known as time-slicing or multiprogramming). This management of concurrent tasks is one of the main responsibilities of almost all operating systems.

The use of multiple concurrent tasks often allows an overall increase in the utilization of the hardware resources. The reason is that while one task is waiting for input or output to happen, the CPU may execute other "ready" tasks. However, as the number of tasks increases, the point may be reached where computational cycles, i.e., CPU power, is the limiting factor. The exact point where this happens depends on the particular workloads; some workloads carry a high computation-to-I/O ratio, others have the inverse ratio.

To permit computer systems to scale to larger numbers of concurrent tasks, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. In addition, each processor may have private memory. The operating system, which is aware of the multiple processors, allows truly concurrent execution of multiple tasks, using time-slicing only when the number of ready tasks exceeds the number of CPUs.

Operating Systems

Modern computer systems consist of one or more CPUs, a memory management unit (MMU) for each CPU, a quantity of memory, and input and output devices such as network interfaces, disks, and printers. Software is also part of a computer system; typically, a software application provides the ultimate utility of the computer system, allowing its users to publish web pages, simulate complicated physical scenarios, or any number of other computational tasks.

Users often want to use more than one of these software applications, perhaps concurrently. To make this possible, software applications are typically written to run on top of a more privileged piece of software, often known as the "operating system." The operating system uses a more privileged mode of the CPU, so that it can perform operations which software applications cannot. Any use of CPUs, MMUs, or I/O devices that a software application requires must in these systems be mediated by the operating system. This prevents buggy application software from damaging the system as a whole.

Because of the operating system's central place in the system software, it can be leveraged for other technical benefits. Furthermore, both users and developers want software applications to run on heterogeneous hardware. To enable this, the operating system typically exports abstractions of the system's hardware, rather than direct representations of them.

Almost all modern operating systems export some notion of "task," or "process," which is an abstraction of a CPU and its MMU. A task is conceptually similar to an execution vehicle, and typically corresponds to a single activity that requires computational resources (memory, CPU, and I/O devices) to make forward progress. The operating system multiplexes these tasks onto the physical CPUs of the system. At any time, the operating system can force a task to give up the CPU on which it is running, in order to run another task (perhaps one that has not run for some time, or one that the user has given a higher priority to).

The Need for Synchronization in Concurrent Systems

Any system with concurrent tasks will share some data among those tasks. Care must be taken when modifying such shared data to preserve correct program semantics.

For example, consider a shared variable that represents the balance of a bank account and assume that two concurrent tasks are accessing the balance. Task 1 wishes to perform a withdrawal, while Task 2 is performing a deposit. By way of illustration, assume further that the program is executing on an abstracted, "typical" computer, for which the assembly language program to withdraw an amount W may look something like:

| | |
|---|---|
| load | balance |
| sub | W |
| store | balance |

The similar program to deposit an amount D will look like:

| | |
|---|---|
| load | balance |
| add | D |
| store | balance |

Now, what if Tasks 1 and 2 both execute these programs concurrently? Suppose the balance starts at 1000; Task 1 is depositing 100 dollars, while Task 2 is withdrawing 100 dollars. The following interleaving of instructions is possible:

| Task 1 | Task 2 | Comment |
|---|---|---|
| load balance | load balance | Both tasks see $1000 |
| add 100 | | Task 1: 1100 |
| | sub 100 | Task 2: 900 |
| store balance | store balance | Race! |

Depending on the order in which the final store instructions execute, either 900 or 1100 will be recorded as the final balance. Thus, either the customer or the bank will have been cheated for $100. This program is said to "race," since, as in a foot race, one cannot know what the result will be until it is run.

The system must therefore provide a way for concurrent tasks to "synchronize," that is, to control concurrency, in order to prevent instruction interleavings such as the above.
Mutual Exclusion, Locking Terminology, Etc.

The question then arises as to what sort of control over concurrency do applications need to maintain correct program semantics. Some systems allow applications complete control over system concurrency; in such systems, the operating system allows tasks exclusive use of system CPUs until the tasks voluntarily relinquish them. Such an arrangement is called "cooperative multi-tasking," since any multi-tasking (i.e., concurrency) happens only through the good will of the running applications. This coarse concurrency control is certainly sufficient to ensure program correctness, since the system is single-threaded until the application specifically indicates to the system that it is prepared for concurrency. Cooperative multi-tasking ensures mutual exclusion only on uni-processor hardware: In a multi-processor system, even if a particular thread does not relinquish a particular processor, then other threads could be running on other processors and nothing would prevent them from entering critical sections.

In such cooperative multi-tasking systems, however, malicious or buggy applications are able to monopolize the system and prevent other tasks from running; this in turn produces the "hangs" that are familiar to users of Microsoft Windows 3.11 and Mac OS versions 9 and earlier, both of which are cooperative multi-tasking systems. Both of these systems have since been supplanted by fully concurrent operating systems, since users find the consequences of cooperative multi-tasking so distasteful. One must therefore choose the set of synchronization primitives carefully; the primitives must be powerful enough to meet the needs of application writers, while still maintaining the primacy of the operating system in CPU allocation.

Over the years, many sets of primitives have been proposed, and proven to be equivalent in their power to express constraints on program concurrency. One such set of primitives, chosen by the pthread library (found in UNIX and Linux-based systems), relies on the mechanisms known as "mutual exclusion" and "condition variables."

With "mutual exclusion," the system ensures that certain "critical sections" of code are executed by at most one task at any given time. In the example above, both the "deposit" and "withdraw" subprograms would together be a critical section. On entry to the critical section, a task must wait for another task to leave the critical section. When exiting the critical section, a task will allow one waiting task to enter the critical section (if there are any tasks waiting to enter it). Thus, there is always at most one task in the critical section. Each critical section in the system is protected by one or more software objects known as "locks." These locks are often spoken of possessively: one may thus refer to "entering a critical section" as "acquiring" the corresponding lock; "leaving a critical section" as "releasing" the corresponding lock; and of "being in a critical section" as "possessing" or "holding" the corresponding lock, etc.
Condition Variables Mutual exclusion allows a thread to safely wait until no other thread is executing in a given critical section. In some cases, however there is a need to cause a thread to wait for some other, potentially more complicated predicate to become true. Such situations are common in multithreaded programming. For example, a thread may need to wait until a pool of work items is non-empty.

If mutual exclusion is the only primitive provided, then the thread has no choice but to "poll" for the condition becoming true; i.e., the thread must spin, continually checking for the condition. Unless the expected time for the condition to become true is small relative to the cost of invoking the operating system's scheduler, such polling wastes CPU cycles. Rather than consuming CPU resources to check for the condition, it would be preferable to run another thread, which might be able to do useful work, and perhaps drive the system forward so that the condition becomes true. To prevent wasteful polling, computer scientists have developed a synchronization primitive known as a "condition variable," sometimes abbreviated "CV." A condition variable is a software object which exports two operations: "Wait" and "Signal." "Wait" takes a lock as a parameter, which the calling task must possess. The Wait operation releases the lock, and blocks the calling task on the condition variable.

The Signal operation awakens one task that has called Wait on the given condition variable, if such a task exists. Upon awakening from its sleep, a task that has called Wait will reacquire the passed lock, possibly having to wait for its turn to do so.

Since the semantics of the Wait operation include blocking, the Wait operation ordinarily involves operating system intervention. However, signaling a "saturated" condition variable (i.e., one on which no task is waiting, or one which already has received more signals than waiting tasks) has no visible effect, and some implementations avoid involving the operating system in such cases as an optimization.

Notice that some aspects of the behavior of the condition variable are intentionally underspecified. In the classic definition of the condition variable, the Wait( ) operation may return spontaneously, even though no Signal( ) operation has occurred. Similarly, if multiple threads have called Wait( ) the Signal( ) operation may wake one, some, or all of these callers; repeated calls to Signal( ) may wake multiple threads in any order.

To better understand the workings of a condition variable, consider the following analogy:

Imagine a multithreaded program, where two threads share a basket which contains some number of apples. In order to look at the basket, put apples into it, or take apples out of it, a thread must hold a lock protecting the basket. Only one thread may hold the lock at any given time.

Thread A wants to take five apples out of the basket, and will accept no fewer than five. It acquires the lock, and sees only three apples. What should it do? Presumably, it wants to wait for two more apples to appear in the basket.

First, Thread A must drop the lock, because, if it doesn't then no other thread will ever be able to put additional apples into the basket. It will also have to reacquire the lock to check for more apples in the future. Assume the basket's lock is found at basket.lck and the number of apples currently in the basket is basket.nApples. Thread A's code might look something like:

Lock(basket.lck)
while (basket.nApples<5) do
Unlock(basket.lck)
Lock(basket.lck)
endwhile
Unlock(basket.lck)

If apples are produced slowly (e.g., thread B has to drive all the way to the supermarket to buy them), then thread A will waste a lot of CPU time executing this code. In some systems, if thread A has higher priority than thread B, then thread B will literally never get to run at all, because the system will be too busy running thread A. Ideally, thread A should go to sleep, freeing up the CPU so that other threads can do work.

Thread A:
   Lock(basket.lck)
   while (basket.nApples<5) do
   Unlock(basket.lck)
   Sleep( )/*Let other threads run until wait condition is satisfied*/
   Lock(basket.Ick)
   endwhile
   Unlock(basket.Ick)

When does thread A wake up? Producers of apples will now have to wake up thread A when there's a chance that there are apples for A.

Thread B:
   Lock(basket.lck)
   ProduceAnApple( )
   basket.nApples:=basket.nApples+1
   Wake( )/*Wake up threads waiting for apples*/
   Unlock(basket.lck)

This might cause thread A to wake up too early, for example, in the case where a fourth (but not yet fifth) apple has been produced. This is not a problem, however: Thread A will just see that there aren't enough apples, and go to sleep again.

However, the code written above is faulty, as can be seen from the following execution interleaving:

| Thread A | Thread B |
|---|---|
| ... | |
| Unlock(basket.lck) | |
| | Lock(basket.lck) |
| | Wake( ) |
| Sleep( ) | |
| ... | |

If this happens, then thread A will never be awakened, since the Wake( ) operation is invoked by Thread B before Thread A goes to sleep, such that the Wake( ) has no effect.

To prevent these sorts of programming errors, the "condition variable" abstraction was developed. Condition variables (CVs) present two, logically atomic operations: the Wait( ) operation, which atomically releases the lock and sleeps, reacquiring the lock on wakeup; and the Signal( ) operation, which simply wakes one or more callers of Wait( ). Using basket.cv to indicate the condition variable, the example above can then be rewritten thus:

Thread A:
   Lock(basket.lck)
   while (basket.nApples<5) do
   Wait(basket.cv, basket.lck)
   endwhile
   Unlock(basket.lck)

Thread B:
   Lock(basket.lck)
   ProduceAnApple( )
   Unlock(basket.lck)
   Signal(basket.cv)

Note that it's acceptable to signal outside the critical section. This is because the lock passed in to Wait doesn't protect the condition variable itself; rather, it protects some other piece of data, known only to the programmers using the CV.

Semaphores

In "The Structure of the THE-Multiprogramming System," Communications of the ACM, 1968, pp. 341-346; and "Co-operating sequential processes," in F. Genuys (ed.) "Programming Languages," Academic Press, New York, 1968, pp. 43-110, among other papers, the famous computer scientist Edsger W. Dijkstra developed the concept of a "semaphore." Dijkstra defined a semaphore as a variable that processes share but that can be manipulated only by operations P( ) and V( ), which abbreviate the Dutch terms "Proberen" (to test) and "Verhogen" (to increment). Both P( ) and V( ) take a non-negative semaphore as an argument. Suppose S is a semaphore. P(S) and V(S) thus indicate applications of these operations to S. The P( ) operation is also sometimes referred to as Down( ) and Sema_Wait( ) similarly the V( ) operation is also referred to as Up( ) and Sema_Signal( ). Still other names are also found in the literature.

Each semaphore has an associated counter, which the P( ) and V( ) operations atomically read, modify, and write. The P( ) and V( ) operations are commonly defined as follows:

```
P(Semaphore S)
   begin
      atomic
         if S>0 then
            S := S−1
         else
            suspend execution of the calling process (the process is suspended
            "on S")
         endif
      endatomic
   end
V(Semaphore S)
   begin
      atomic
         if at least one process is suspended on S then
            unblock ("wake") one suspended process
         else
            S := S+1
         endif
      endatomic
   end
```

In order to avoid race conditions, both P( ) and V( ) must be atomic. If one or more processes are suspended on the semaphore S, then V(S) causes one of them to be "released" or "unblocked" to continue execution.

The semaphore S may be initialized to any non-negative integer value, usually unity. In general, the semaphore S indicates the number of units of a resource that are free. If the resource is unitary, including the case where the resource is the mechanism that allows a process to enter and execute a critical code section, then it is advantageous to initialize S=1 and to let unity be the maximum, "saturated" value assumed by the counter S. No further state change will then result from additional V(S) calls. The semaphore then becomes "binary," taking only the values 0 or 1. The pseudocode for P(S) and V(S) above can then be reduced to the following:

```
P(Semaphore S)
   begin
      atomic
         if S=1 then
            S:=0
         else
            suspend execution of the calling process
         endif
      endatomic
   end
V(Semaphore S)
   begin
      atomic
         if at least one process is suspended on S then
            wake one suspended process
```

-continued

```
        else
            S:=1
        endif
    endatomic
end
```

Whether at least one process is suspended on S is determined using conventional mechanisms, such as with a binary flag, or a counter that increments as processes are suspended and decrements as processes are awakened. The operating system (or some other software entity) may decide which suspended process is to be unblocked in any of many known ways, for example, by using a simple FIFO queue. If other selection algorithms are used, care should be taken to ensure that no process is starved.

Many variations on Dijkstra's semaphore primitives P( ) and V( ) have been developed and are in wide use, so much so that all common OSs now provide semaphores or some other implementation of the function of a semaphore using some combination of other known synchronization primitives. Note that a data type is generally defined by its operation, so if it operates as a semaphore, then it is a semaphore.

For the sake of concreteness, the invention is presented below as being based on a platform providing binary semaphores. However, the invention can equivalently be expressed using monitors, conditions and mutexes, events, counting semaphores, or any other set of synchronization primitives equivalent in expressiveness to the binary semaphore. The required transformation is obvious to those skilled in the art.

Atomic Instructions

In order to program certain multiprocessor data structures and algorithms, such as the Semaphore introduced above, some hardware support is required. This support typically makes it possible to reliably read a memory cell, perform some computation based on that value, and write back a new value, without any possibility of other CPUs in the system interfering. While multiple forms of such support have existed, a common one is the "Atomic Compare-And-Swap" instruction. This instruction is given three inputs: an address of a memory cell, a "compare" value, and a "write" value. If the contents of the memory cell are identical with the "compare" value, the "write" value is deposited in the memory cell. A Boolean indicator of success or failure is output: success means that the memory cell matched the "compare" value, and therefore that the "write" value has been written, while failure means that the cell had some other value, and has not been modified.

Other primitives of similar expressive power, such as "load-linked/store-conditional", have been explored. All such alternatives on modern multiprocessor architectures are capable of supporting an atomic compare-and-swap facility in software where one has not been explicitly provided in hardware. The present invention, for the sake of concreteness, is presented in terms of an atomic compare-and-swap primitive. If the hardware provides a different primitive set, then the software mapping between this set and atomic compare-and-swap will be obvious to a skilled practitioner. In many computer systems, such atomic instructions are much more expensive than a simple load/store pair. This can be caused by micro-architectural concerns, or by system-wide issues such as the cache coherency protocol. In such systems, minimizing atomic read-modify-write operations is valuable for performance.

Implementing Condition Variables

The main goals for a condition variable implementation are:

1. Freedom from starvation. There should be a guarantee that any process waiting on a condition variable will be woken up after a finite number of signals.

2. Minimization of atomic read-modify-write operations, which are often very expensive.

A simple way to guarantee the first goal is to use a first-in, first-out queue, or FIFO. Threads invoking Wait enter the queue at the tail and leave from the head. Signal dequeues a thread to awaken, if the queue is non-empty. When a thread calls Wait, it enters the queue behind N other waiting threads; it will therefore be woken up after N+1 signal operations.

However, implementing a FIFO in a manner that doesn't compromise goal 2 is difficult. The standard implementation of a concurrent FIFO uses a linked list, where the links and head/tail pointers are protected by a lock. Since insertion and removal to such a FIFO require updating two fields at two separate addresses, the list is difficult to implement in a lock-free manner.

What is needed is therefore an implementation of a condition variable that meets both goals, and that does so more efficiently, and thus faster, than existing implementations. This invention meets this need.

SUMMARY OF THE INVENTION

Given a computer system that has at least one processor with at least one instruction for atomically changing the contents of a data word, and a plurality of threads of execution running concurrently on the processor(s), the invention provides a condition variable comprising computer-executable code for synchronizing the threads. The condition variable includes a data structure that has a head list linking threads in an arrival order and a tail list linking threads in a reverse arrival order. The head and tail lists, which may be implemented as singly linked lists, together indicate which threads are currently blocked on the condition variable.

In a preferred embodiment of the invention, the invention has a head pointer to a first thread blocked in the head list, if any; a tail pointer to the last thread blocked in the tail list, if any; a wait counter indicating how many threads are currently linked in the data structure; and a signal counter indicating how many times the condition variable has been signaled for waiting threads that are currently linked in the data structure.

According to one aspect of the invention, the data structure may be made lock-free.

Where a semaphore is associated with each thread, the condition variable further comprises computer-executable code for incrementing the wait counter each time a new thread is added to the data structure; for incrementing the signal counter when the condition variable is not saturated and is signaled and for decrementing the signal counter when a listed thread leaves the data structure; and for indicating to the semaphore of the first thread in the head list that the first thread has become releasable and may proceed to run only when the number of threads having signaled the condition variable changes from zero to one.

The condition variable preferably also inserts an identifier of a new current thread at the end of the data structure and increments the wait counter. Additionally, the condition variable further comprises computer-executable code for linking the threads in the tail list in arrival order to the head list if the head list is empty; for removing a current thread from the data structure and decrementing both the wait and signal counters; and for performing a cascading wake-up of other releasable threads in the data structure.

In a preferred embodiment of the invention, the head pointer, the tail pointer, the wait counter and the signal counter all comprise portions of a single atomically updatable data word.

DETAILED DESCRIPTION

This invention combines a novel representation of a lock-free FIFO queue and a pair of counters to make possible an implementation of a condition variable in a single, atomically updatable word. This novel representation uses singly linked cells, allowing insertions and removals with a single expected atomic read-modify-write.

The queue may be represented using a single "word," where "word" is defined as any suitably sized unit addressable by the platform's read-modify-write primitives. The bits in the word are then partitioned into four groups or fields which, for simplicity of addressing, may be of the same size. For example, on a machine whose words are 32 bits, the invention preferably partitions the word into four eight-bit groups; in other words, each "group" is preferably one byte. These groups/fields are referred to below as head, tail, nsigs, and nwaits. As will be clearer after studying the rest of this explanation of the invention, the number of bits in each of these groups/fields constrains the total number of threads in the system.

The invention may be applied in other systems that use words having a different number of bits than 32, in which case the number of bits in each group should be adjusted accordingly.

The various procedures implemented in the invention are described below using pseudo-code that will be readily understandable by skilled programmers, who will also be able to convert it into whatever instruction set or programming language called for in a given application of the invention. Using common notation, cv.head, cv.tail, cv.nsigs, and cv.nwaits refer to the bit groups of the single-word condition variable cv that contain the values of head, tail, nsigs, and nwaits, respectively. The functions of other variables given below will be obvious from their names.

FIFO Queue

Head and tail are both preferably singly linked lists of waiting threads (or processes). These two linked lists, taken together, comprise the queue. The front of the FIFO queue is the thread pointed to by head, if any. The end of the FIFO queue is the thread pointed to by tail, if any. Using singly-linked lists is both sufficient and fast, since they can be easily added to and taken away from with simple instructions. Other data structures (both software and hardware) may be used instead, however, both more complicated, such as doubly linked lists, and stacks, although these alternatives will typically have either needless added complexity or size limitations.

In the illustrations of the operation of the invention described below, from the perspective of the queue, the singly linked list anchored at tail is logically reversed: to traverse the entire queue in order, one first traverses the list anchored at head, then reverses the list anchored at tail and traverses this reversed list.

According to the invention, an Enqueue operation performed on the condition variable's queue implements the following procedure to place a thread thr at the head of the queue if the queue is empty, and to place thr at the tail of the queue otherwise:

```
Enqueue(ConditionVar cv, Thread thr)
   begin
      if cv.head is empty then
         cv.head := thr
      else
         thr.next := cv.tail
         cv.tail := thr
      endif
   end
```

Here, it is assumed that the thread data structure has a field (thr.next) dedicated to storing the thread on the condition variable's linked list.

A Dequeue operation on a non-empty queue (the only situation in which this procedure is invoked) implements the following procedure to remove the first thread from the list anchored at the head and, if this would leave the head list empty, it additionally reverses the tail list and appends it in proper FIFO order to the head list, so that there will never be an empty head list with a non-empty tail list:

```
Thread Dequeue(ConditionVar cv)
   begin
      thr := cv.head
      if thr.next is empty then
         thr.next := ListReverse(cv.tail)
         cv.tail := null
      endif
      cv.head := thr.next
      return thr
   end
```

ListReverse is simply a standard function for implementing reversal of a singly-linked list.

Observe that the exemplifying pseudocode for the FIFO Enqueue( ) and Dequeue( ) operations above operates on the queue in isolation, not in the context of the invention's condition variable structure, which is described in greater detail below.

Condition Variable Routine

The nwaits counter counts the number of threads currently waiting on the condition. The nsigs parameter is incremented each time Signal( ) is invoked and the condition variable is not saturated, and is decremented each time a thread leaves the queue; thus, nsigs counts the number of Signal( ) operations that have been performed for which the waiting threads are still in the process of finishing up their Wait( ) operations.

The condition variable according to the invention operates together with any known semaphore associated with each thread. The Signal operation atomically increments the nsigs field, saturating at the value of nwaits. If nsigs has gone from zero to one, then the Signal( ) code invokes V(head.semaphore), that is, it invokes the V( ) operation on the semaphore for the thread at the head of the condition variable's thread queue. In pseudocode:

```
Signal(ConditionVar cv)
   begin
      atomic
         oldNSigs := cv.nsigs
         head := cv.head
         if cv.nsigs = cv.nwaits then
            return
         endif
         cv.nsigs := cv.nsigs + 1
      endatomic
      if oldNSigs = 0 then
         V(head.semaphore)
      endif
   end
```

Note that a Broadcast(cv) operation is also found in the literature: This operation releases all threads currently waiting on the condition variable and is equivalent to a saturating number of Signal(cv) invocations done all at once. The code for Broadcast(cv) is similar to the code for Signal(cv), the only difference being that instead of incrementing nsigs, it should be set equal to nwaits so as to immediately saturate the condition variable.

The Wait operation is more complicated, since it is responsible for the maintenance of the thread queue. It first inserts the calling thread into the queue, and increments nwaits. Both of these operations are performed atomically.

It then releases the passed-in lock, and performs a P( ) operation on its local semaphore, usually putting the calling thread to sleep. Eventually, some other thread will perform an V( ) on this semaphore, waking the calling thread. It is also possible that some other thread will already have performed a V( ) operation on this semaphore, since the P( ) in Wait may race with the V( ) in Signal. Regardless, after the P( ) operation completes, the waiting thread dequeues itself from the thread queue, and decrements nsigs and nwaits atomically. If there are more signals pending on the condition variable, then it performs a V( ) operation on semaphore belonging to the new head of the queue.

```
Wait(ConditionVar cv, Locklck)
   begin
      atomic
         cv.nwaits := cv.nwaits + 1
         Enqueue(cv, theCurrentThread)
      endatomic
      Unlock(lck)
      P(theCurrentThread.semaphore)
      atomic
         Dequeue(cv, theCurrentThread)
         cv.nwaits := cv.nwaits − 1
         cv.nsigs := cv.nsigs − 1
         newHead := cv.head
         pendingSigs := cv.nsigs
      endatomic
      Lock(lck)
      if pendingSigs > 0 then
         V(newHead.semaphore)
      endif
   end
```

The version of the Wait( ) operation given above is simplified and informal, in that it is not in a form that can be implemented directly; moreover, this version of Wait( ) uses the previously explained Enqueue( ) and Dequeue( ) as subroutines, rather than expanding them within the Wait( ) itself. This has been done only to aid the reader in understanding the function and flow of a Wait( ) operation. In the actual, working implementation of Wait( ) given below, the functions performed by Enqueue( ) and Dequeue( ) are integrated into FIFO construct according to the invention, which also involves operations on two parameters nsigs and nwaits.

In considering the "atomic/endatomic" clauses, one should keep in mind that the invention makes it possible to put all of the condition variable's fields into a single word, which makes it possible to implement them with only a single expected atomic operation. What follows is code that defines the preferred Signal( ) and Wait( ) operations that use this feature of the invention. The "atomic" construct used above is implemented using a loop with a single Atomic_CAS operation, denoting the Atomic compare-and-swap facility described above. The loop will execute more than once only when the condition variable is under contention.

```
Signal(ConditionVar cv)
   begin
      repeat
         oldCv := cv
         newCv := oldCv
         if oldCv.nsigs = oldCv.nwaits then
            return
         endif
         newCv.nsigs := newCv.nsigs + 1
      until Atomic_CAS(cv, oldCv, newCv)
      if oldCv.nsigs = 0 then
         V(oldCv.head.semaphore)
      endif
   end
Wait(ConditionVar cv, Locklck)
   begin
      repeat
         oldCv := cv
         newCv := oldCv
         if oldCv.head is empty then
            newCv.head := theCurrentThread
         else
            theCurrentThread.next := newCv.tail
            newCv.tail := theCurrentThread
         endif
         newCv.nwaits := newCv.nwaits + 1
      until Atomic_CAS(cv, oldCv, newCv)
      Unlock(lck)
      P(theCurrentThread.semaphore)
      repeat
         oldCv := cv
         newCv := oldCv
         if theCurrentThread.next is empty then
            repeat
               oldCv := cv
               newCv := oldCv
               newCv.tail := null
            until Atomic_CAS(cv, oldCv, newCv)
            theCurrentThread.next := ListReverse(oldCv.tail)
         endif
         newCv.nwaits := newCv.nwaits − 1
         newCv.nsigs := newCv.nsigs − 1
         newCv.head := theCurrentThread.next
      until Atomic_CAS(cv, oldCv, newCv)
      Lock(lck)
      if newCv.nsigs > 0 then
         V(newCv.head.semaphore)
      endif
   end
```

Although the Signal and Wait operations rely on the lock-like properties of the semaphore, note that the list data structure of the invention's condition variable itself is lock-free.

The operation of the version of Wait( ) used in the invention differs from that of the simplified, informal illustrative Wait( ) operation discussed above. These differences can be understood by considering certain aspects of the invention's Wait( ) procedure:

The invention combines the updates of the 4-tuple nsigs/nwaits/head/queue to atomically manipulate the FIFO queue and the counters; consequently, separately defined Enqueue( ) and Dequeue( ) operations are no longer needed or useful. Some of the novel aspects of the Wait( ) routine according to the invention can be better understood by considering certain of the operations it performs:

When a thread invokes Wait( ), it appends itself to the queue and at the same time increments nwaits. The thread then suspends itself on its semaphore (P( )).

After completing P( ), the thread must remove itself from the FIFO queue. This is the most subtle part of the Wait( ) routine according to the invention. The invention exploits that there is no concurrency when attempting to remove entries from the FIFO queue—Only the thread at the head of the FIFO queue can be let loose only by some other thread doing V( ) on its semaphore: a thread invoking Signal( ) will only invoke V( ) on the head thread's semaphore (newCv.head-.semaphore) if nsigs transitioned from 0 to 1; and a thread finishing up Wait( ) will invoke V( ) on the new head thread's semaphore only if nsigs still remains positive.

The two conditions just mentioned are mutually exclusive: the Signal( ) operation can start the process of removing threads by activating one of them, and the Wait( ) operation can ensure that they continue to trickle out one by one by activating the next one as each previous one leaves.

Thread removal must be staged in several steps if the thread being removed is the sole item on the head list. More precisely, if the current thread is the only thread on the head list, then the invention removes the tail, using this loop:

repeat
oldCV:=cv
newCv:=oldCv
newCv.tail:=null
until Atomic_CAS(cv, oldCv, newCv)

Note that the tail list may be empty, but that this is not a problem. With the tail identified and removed, and because no other thread can concurrently be removing entries from the FIFO queue, the tail list may be manipulated with no effect on other data structures.

Accordingly, the invention reverses the tail list (rebuilding it by relinking the threads), which is an operation that does not require atomicity. Moreover, the reversal of an empty tail list is simply also an empty tail list.

The reversed tail list is then appended at the end of the head list. No other thread that arrives into the FIFO queue will attempt to insert itself in the head position because arriving threads must go into the tail list when the head list is not empty.

One of two situations will then be found: 1) the current thread is alone on the head list and the tail list is probably empty; or 2) the current thread is not alone on the head list.

At this point the invention can compute an updated newCv 4-tuple, which reflects that the current thread is no longer on the head list, with nwaits and nsigs decremented, and with no change on the tail list (whatever the tail list currently is). The invention then attempts to atomically swap the updated newCv value into the condition variable. If this is successful, then the routine is finished. If this is not successful, however, repeat all of the above steps are repeated. Success is assured after a finite number of attempts, since only a finite number of other threads can insert themselves onto the tail list while thread removal is being attempted.

As the last step before leaving Wait( ) the routine checks whether the number of pending signals is still positive, in which case it prods the next thread by invoking P( ) on its semaphore.

Example

Figure 1:
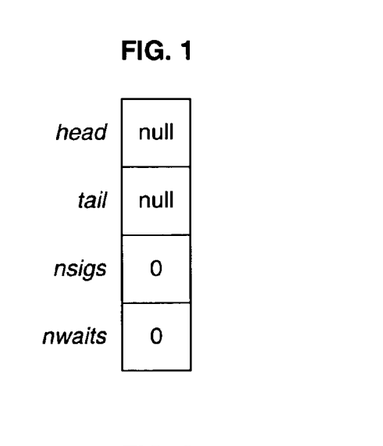
FIGS. 1-11 illustrate the state of various fields of the condition variable according to the invention as different threads wait for and signal it.

Now consider an example of the invention's condition variable in action. FIG. 1 shows a condition variable in its "resting state", in which no threads are currently waiting. While the condition variable is in its resting state, any Signal operations performed will be ignored. Since no thread is waiting for the condition variable, no action needs to be taken in response to a Signal operation.

Figure 2:
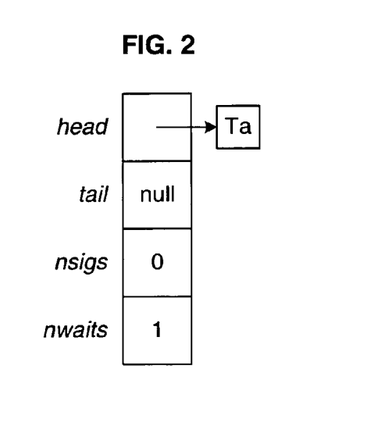

Next, thread Ta performs a Wait operation. This increments the nwaits field, and inserts Ta into the queue represented by the head and tail fields. Since the list anchored at head is empty at the beginning of the Wait operation, this is accomplished by pointing the head field at Ta, as illustrated in FIG. 2.

Figure 3:
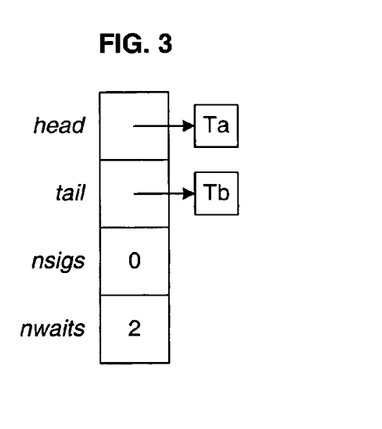

Now thread Tb performs a Wait operation. As before, it increments the nwaits field, and inserts itself into the queue represented by the head and tall fields, as illustrated in FIG. 3. Since the head field of this queue is non-empty, Tb inserts itself into the list anchored at tail. Traversing the queue represented by the head and tail fields will visit the two threads in the order Ta, Tb.

Figure 4:
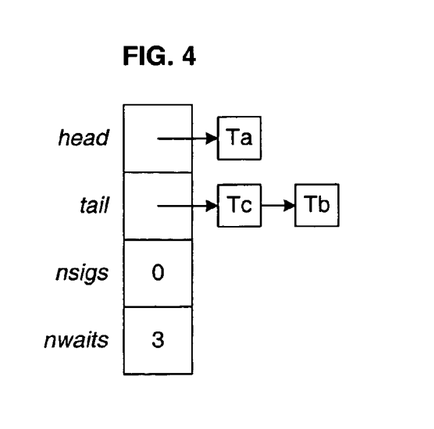

Now consider FIG. 4, which illustrates the arrival of a third waiting thread, Tc. Again, Tc's Wait operation increments nwaits, and logically inserts itself into the queue represented by head and tail. As Tb did, Tc prepends itself to the list rooted at tail. Traversing the queue (as shown in the figures, tail "right to left" and head "left to right") will visit the threads in the order Ta, Tb, Tc.

Figure 5:
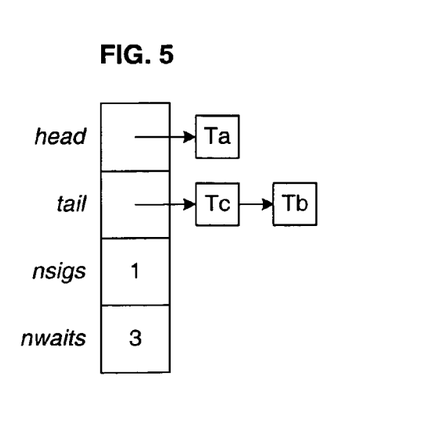

Now assume that the example condition variable receives a Signal operation from some running thread. This could be any thread in the system other than Ta, Tb, or Tc, all of which are blocked waiting on the condition variable. The Signal operation simply increments the nsigs field, and, noticing that it has moved this field from 0 to 1, performs a V( ) operation on the semaphore of the thread at the head of the condition variable's queue, in this case, thread Ta. Note that exactly one thread will notice the atomic transition from 0 to 1. FIG. 5 shows the condition variable after the completion of the Signal operation, but before thread Ta has woken up from the P( ) in the middle of its Wait invocation. The only change visible in the figure is the new value for nsigs, which has gone from 0 to 1; thread Ta's semaphore has received a V( ) operation, however, making Ta runnable.

Figure 6:
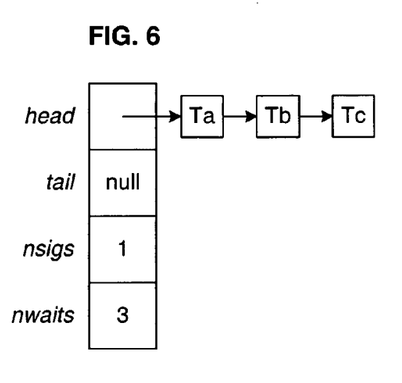
Figure 7:
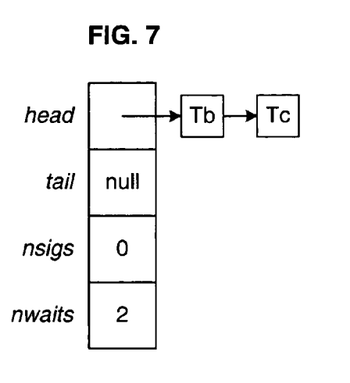

After thread Ta awakens, it continues executing the body of the Wait operation. Thread Ta finds that it is the last item on the list anchored at head, so it reverses the list anchored at tail, and appends the reversed list to the list anchored at head by pointing its own link at thread Tb. As FIG. 6 illustrates, traversing the queue in order still produces Ta, Tb, Tc:

Finally, as illustrated in FIG. 7, thread Ta is ready to dequeue itself and decrement nwaits and nsigs. Since nsigs has reached 0, there is no more work to perform in the Wait operation.

Figure 8:
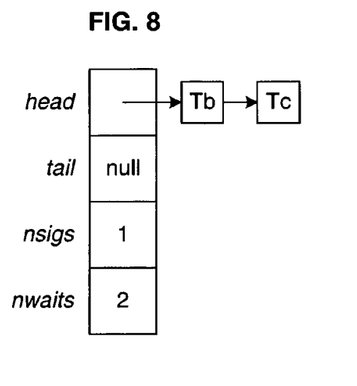

Now consider two Signal operations executing in rapid succession. The first Signal operation wakes up Tb and increments nsigs, resulting in the state illustrated in FIG. 8.

Figure 9:
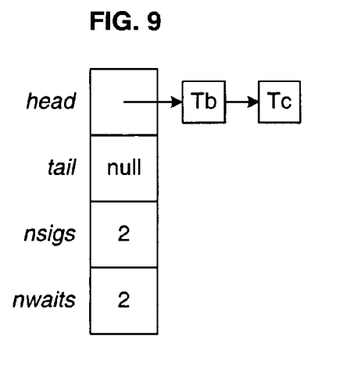

The next Signal operation occurs before thread Tb has woken up and begins executing the rest of its Wait operation. This operation increments nsigs once again, and creates the state shown in FIG. 9. However, since nsigs is not going from 0 to 1, the Signal operation doesn't perform a V( ) on any thread's semaphore, a consequence of the code portion that executes V(oldCv.head.semaphore) only if oldCv.nsigs=0

Note that any further signal operations taking place on the condition variable in this state (still, FIG. 9) will be ignored, since nsigs is equal to nwaits. Such a condition variable is said to be "saturated"; i.e., it has absorbed all the Signal operations it has the capacity to tolerate. The resting state, in which no threads are waiting on the condition variable, is a degenerate saturated state, since both nsigs and nwaits are zero.

Figure 10:
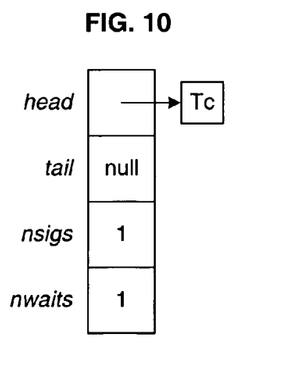

Eventually, thread Tb wakes up from sleeping on its semaphore, and continues executing its Wait operation. It decrements the nsigs and nwaits fields, and removes itself from the list anchored at head, as illustrated in FIG. 10.

This time, the nsigs variable is non-zero when it reaches the final "if" statement of the Wait operation. To recognize this pending Signal operation, Tb therefore performs a V( ) operation on thread Tc's semaphore.

Figure 11:
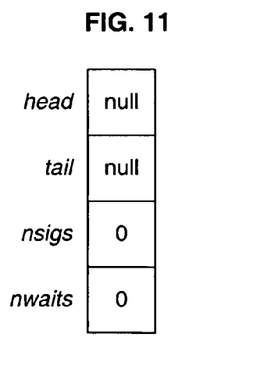

Finally, Tc awakens from its sleep. It decrements nsigs and nwaits, and removes itself from the list anchored at head. The condition variable has now returned to the resting state shown in FIG. 11, which is the same as the state shown in FIG. 1.

Note that the sequential V( ) operations performed by threads dequeueing themselves amounts to a cascading wake-up in that each thread wakes up its successor thread, which in turn decrements nsigs and nwaits, dequeues itself, awakens the next thread, etc., until no threads remain that can be released from the condition variable. That a thread Tx is releasable means that its continued forward execution is no longer dependant on any other thread's action other than another thread performing a V( ) operation on Tx's semaphore.

Location

The code defining the condition variable according to the invention may be used in any existing software entity that is designed to use such a concurrency control mechanism. Consequently, the invention may be used to replace existing condition variable code, or may be included in the original code of execution threads as an efficient mechanism for concurrency control.

Figure 12:
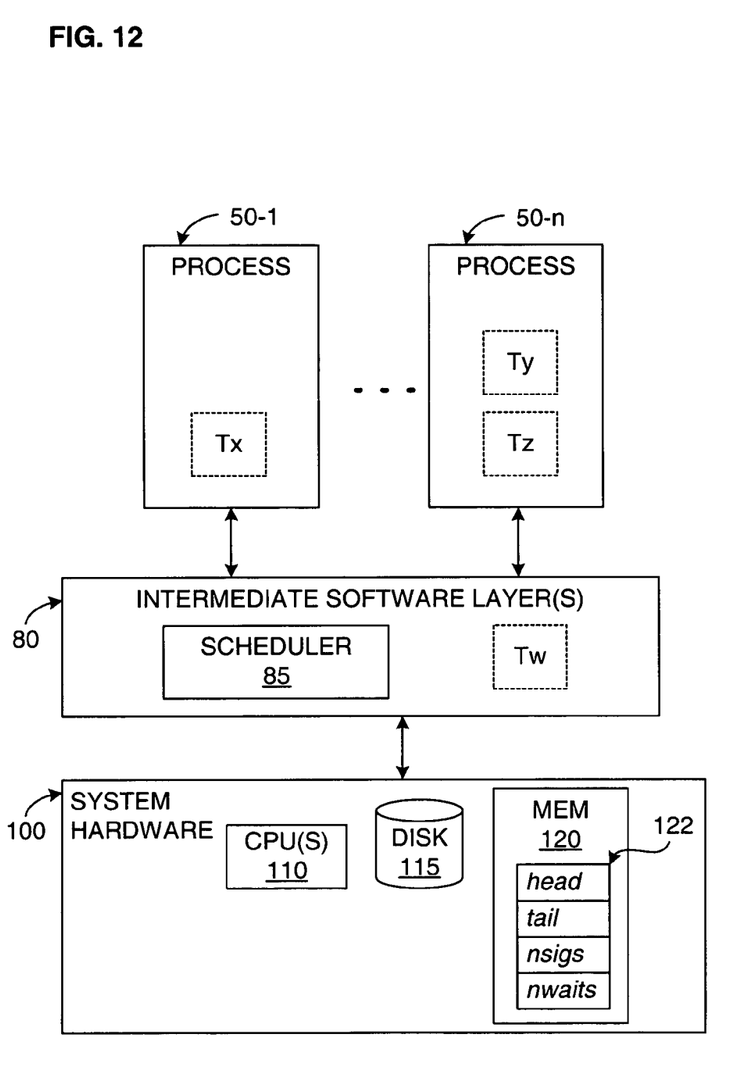
FIG. 12 illustrates a generalized computer system in which concurrent executable threads include the condition variable according to the invention.

FIG. 12 illustrates a generalized computer system in which several processes 50-1, . . . , 50-n are running via at least one intermediate software layer 80 on system hardware 100. Examples of processes range from conventional applications to complete hosted or non-hosted virtual machines, such as those sold by VMware, Inc., of Palo Alto, Calif. At least one of the intermediate software layer(s) will consist of or include some form of operating system (including kernels specially designed to support virtual machines); as such, in addition to other typical components, the intermediate layer will normally also include a scheduler 85, which is invoked in any known manner for scheduling and descheduling threads.

The system hardware 100 will also include typical components, such as one or more CPUs 110, a non-volatile mass-storage device such as a disk 115, and a memory 120. The single data word 122 used to implement the condition variable according to the invention will typically be established in the memory 120.

As FIG. 12 illustrates, threads of execution Tx, Ty, Tz, Tw may be located in any software process, at both the user and system levels, and more than one may be in any one process. Each such thread that is to run concurrently with other threads that need to operate on the same condition variable can be provided with the computer-executable code according to the invention.

We claim:

1. In a computer system that has at least one processor with at least one atomic instruction for atomically changing the contents of a data word, and a plurality of threads of execution running concurrently on the processor(s), a condition variable comprising:
    computer-executable code for synchronizing the threads;
    a head list and a tail list together indicating which threads, if any, are currently blocked on the condition variable,
    wherein the head list links threads in arrival order and the tail list links threads in reverse arrival order, the head list and the tail list together indicating an arrival order for any currently blocked threads; and
    a data structure comprising:
        a head pointer to a first blocked thread in the head list, if any;
        a tail pointer to the last blocked thread in the tail list, if any;
        a wait counter indicating how many threads are currently linked in the data structure; and
        a signal counter indicating how many times the condition variable has been signaled for waiting threads that are currently linked in the data structure,
        wherein the head pointer, the tail pointer, the wait counter and the signal counter all comprise portions of a single data word that can be atomically updated using a single atomic instruction, the data word comprising a unit of data bits addressable by read-modify-write primitives, the data bits being partitioned into four groups of data bits, a first group constituting the head pointer, a second group constituting the tail pointer, a third group constituting the wait counter and the fourth group constituting the signal counter,
        wherein when a wait function is invoked for a first thread, the first thread is linked into the data structure and the wait counter is incremented, both in a single atomic operation using a single atomic instruction, and
        wherein when a second thread is to be dequeued, the second thread is removed from the data structure, the wait counter is decremented and the signal counter is decremented, all three in a single atomic operation using a single atomic instruction.

2. A condition variable as in claim 1, in which the data structure is lock-free.

3. A condition variable as in claim 1, in which the head and tail lists are each singly linked.

4. The condition variable of claim 1, where a semaphore is associated with each thread, the condition variable further comprising computer-executable code:
    for incrementing the wait counter each time a new thread is added to the data structure;
    for incrementing the signal counter when the condition variable is not saturated and is signaled and for decrementing the signal counter when a listed thread leaves the data structure; and
    for indicating to the semaphore of the first linked thread in the head list that the first linked thread has become releasable and may proceed to run only when the number of threads having signaled the condition variable changes from zero to one.

5. The condition variable of claim 4, further comprising computer-executable code:
    for linking the threads in the tail list in arrival order to the head list when there is only one thread in the head list and that one thread is to be removed from the head list;
    for removing a current thread from the data structure and decrementing both the wait and signal counters; and
    for performing a cascading wake-up of other releasable threads in the data structure.

6. In a computer system that has at least one processor with at least one atomic instruction for atomically changing the contents of a data word, and a plurality of threads of execution running concurrently on the processor(s), a semaphore being associated with each thread, a condition variable comprising:
    computer-executable code for synchronizing the threads;

a head list and a tail list each being singly linked and together indicating which threads, if any, are currently blocked on the condition variable, wherein, the head list links threads in an arrival order and the tail list links threads in a reverse arrival order, the head list and the tail list together indicating an arrival order for any currently blocked threads; and a lock-free data structure comprising:

a head pointer to a first blocked thread in the head list, if any;

a tail pointer to the last blocked thread in the tail list, if any;

a wait counter indicating how many threads are currently linked in the data structure; and     a signal counter indicating how many times the condition variable has been signaled for waiting threads that are currently linked in the data structure,     wherein the head pointer, the tail pointer, the wait counter and the signal counter all comprise portions of a single data word that can be atomically updated using a single atomic instruction, the data word comprising a unit of data bits addressable by read-modify-write primitives, the data bits being partitioned into four groups of data bits, a first group constituting the head pointer, a second group constituting the tail pointer, a third group constituting the wait counter and the fourth group constituting the signal counter,     wherein when a wait function is invoked for a first thread, the first thread is linked into the data structure and the wait counter is incremented, both in a single atomic operation using a single atomic instruction, and     wherein when a second thread is to be dequeued, the second thread is removed from the data structure, the wait counter is decremented and the signal counter is decremented, all three in a single atomic operation using a single atomic instruction, the computer-executable code including code for:

incrementing the wait counter each time a new thread is added to the data structure;

incrementing the signal counter when the condition variable is not saturated and is signaled and decrementing the signal counter when a listed thread leaves the data structure;

indicating to the semaphore of the first linked thread in the head list that the first linked thread has become releasable and may proceed to run only when the number of threads having signaled the condition variable changes from zero to one;

linking the threads in the tail list in arrival order to the head list when there is only one thread in the head list and that one thread is to be removed from the head list;

removing a current thread from the data structure and decrementing both the wait and signal counters; and performing a cascading wake-up of other releasable threads in the data structure.

\* \* \* \* \*